United States Patent [19]
Ziegler et al.

[11] Patent Number: 5,175,941
[45] Date of Patent: Jan. 5, 1993

[54] METHOD AND APPARATUS FOR FITTING EYEWEAR

[75] Inventors: Thomas J. Ziegler, Cincinnati; Thomas J. Kremer, Loveland, both of Ohio

[73] Assignee: The United States Shoe Corporation, Cincinnati, Ohio

[21] Appl. No.: 816,625

[22] Filed: Dec. 31, 1991

[51] Int. Cl.⁵ .............................. G01B 5/14; A61B 3/10
[52] U.S. Cl. ............................................. 33/810; 33/200
[58] Field of Search ................ 33/810, 811, 812, 200, 33/511, 512

[56] References Cited

U.S. PATENT DOCUMENTS

| | | | |
|---|---|---|---|
| 1,656,438 | 1/1928 | Hunter | 33/200 |
| 2,305,376 | 12/1942 | Blum | 33/810 |
| 2,668,359 | 2/1954 | Litchfield | 33/810 |
| 2,705,369 | 4/1955 | Trani | 33/3 A |

FOREIGN PATENT DOCUMENTS 56162 11/1912 Austria .................................. 33/810

Primary Examiner—Harry N. Haroian
Attorney, Agent, or Firm—Frost & Jacobs

[57] ABSTRACT

A method is provided for fitting an eyeglass frame to a wearer. The method includes the steps of providing frames which have been classified into predetermined temple to temple size ranges based on the temple to temple frame sizes of the frames. The wearer's temple to temple head size is measured using a device which indicates at least one temple to temple size range as corresponding to the wearer. Eyeglass frames are fitted to the wearer selected from the frames which fall within the temple to temple size ranges corresponding to the wearer.

21 Claims, 3 Drawing Sheets

METHOD AND APPARATUS FOR FITTING EYEWEAR

TECHNICAL FIELD

The present invention relates generally to a method and apparatus for use in fitting eyewear, and is particularly directed to a method and apparatus for fitting an eyeglass frame for a person who wears or is going to wear eyewear (herein referred to as a "wearer") based on an objective evaluation of physical attributes of the wearer and the frames. The invention will be specifically disclosed in connection with a method in which the stock of eyeglass frames offered for selection to the wearer has been identified as falling within predetermined size ranges, and the wearer's temple to temple head size is determined so as to identify frames from the corresponding size range.

BACKGROUND OF THE INVENTION

Selection of properly sized eyeglasses is one of the most difficult problems in fitting eyeglasses to a wearer. The current method for selecting eyeglass frames is a subjective approach wherein the selection is based primarily on cosmetic considerations rather than proper physical fit. Even when physical fit is considered in the selection of frames, the criteria is subjective and depends very much upon the skill of the fitter. The typical criteria for judging physical fit relies on such subjective considerations as face shape, length of face and facial balance. Until the invention of the present method, there has been no objective way to ensure the proper physical fit of frames The difficulty in fitting frames is exacerbated by the large number of different frames which are available. The wearer is typically unskilled in judging which frames being offered for sale are the correct size for his or her head, and consequentially is unable to limit his or her search to those frames which are the proper physical size. Without such a limitation on the wearer's search, the wearer will typically select frames based only on cosmetic considerations and frequently selects frames which appear aesthetically pleasing as displayed but which are not the proper size for the wearer's head. Once the wearer has made such a selection of improperly sized frames, it is typically awkward and difficult for the fitter to persuade the wearer that the selected frames are not the right size. An objective system approach is more likely to be accepted by the wearer, than statements about size made only by the fitter.

There are different systems for identifying various measurements of frames. One such well known system widely used is the "boxing system", in which rectangular boxes are modeled about each lens opening of the frame. The horizontal measure of this box is referred to as the eye size, and is denoted by the letter "A". The distance between each box is known as the distance between lenses or bridge size, and designated by the letters DBL.

Manufacturers of frames which are sized according to the boxing system typically mark the frame using the format: A☐DBL. For example, such a marking might appear as: 52☐22, meaning that the eye size of the frame is 52 mm and the distance between the lenses is 22 mm. Generally, the eye size measurement for different sizes of frames of a given style change in two millimeter increments, such as 50 mm, 52 mm, 54 mm, etc.

Although the boxing system provides an objective standard for sizing the lens opening and bridge size, it does not provide any indication of the overall width of the frame, because there is an overhanging portion on either side of the frame extending beyond the outer edge of the boxing system. The boxing system does not indicate the spacing between the temples of the frames which is important to the selection of properly fitting frames. The boxing system also does not provide a way to distinguish between frame sizes. For example, the distance between the outer lens edges for a 54☐16 is the same as for a 52☐20. The boxing system does not provide a way to group the frames according to their temple to temple widths.

Thus, there is a need for a method of fitting frames which is based on objective criteria and which is easily understood.

SUMMARY OF THE INVENTION

It is an object of the present invention to provide a method and apparatus for use in fitting eyeglass frames which incorporates an objective criteria on which the selection of frames is based.

It is another object of the present invention to provide a method and apparatus for identifying temple to temple size ranges which correspond to the wearer.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a method of fitting eyeglass frames is Provided in which a plurality of frames are provided which have been identified as having a temple to temple frame size falling within one of several predetermined temple to temple size ranges. At least one temple to temple size range is identified as corresponding to the wearer. An eyeglass frame is then fitted to the wearer which has been selected from the group of frames having temple to temple frame sizes which fall within any corresponding temple to temple size range.

In accordance to a further aspect of the present invention, the temple to temple head size of the wearer is measured, and any temple to temple size range which has either its upper or lower range limit within a predetermined fitting range of the wearer's temple to temple head size is identified as corresponding to that wearer.

According to a further aspect of the invention, the respective spans of all of the temple to temple size ranges are equal.

In a still further aspect of the present invention, one or more of the respective spans of each respective temple to temple size range and the fitting range is 4 mm.

In accordance to yet another aspect of the present invention, means are provided for measuring the temple to temple head size of the wearer, the means including two spaced apart measuring tips which are moveable with respect to each other, a scale, an indicator means for indicating on the scale a location which corresponds to the distance between the measuring tips. A plurality of designations are carried by the scale, with each respective designation identifying a respective temple to temple size range. The designations are located on the scale at respective locations such that the indicator means indicate the respective designation of the temple to temple size range within which the distance between the measuring tips fall.

According to a still further aspect of the present invention, the respective designation assigned to each temple to temple size range is a color which designates the respective temple to temple size range.

In yet another aspect of the present invention, each frame carries a respective tag which includes a color which is the color that designates the respective temple to temple size range within which the temple to temple frame size of that frame falls.

According to a further aspect of the present invention, the plurality of temple to temple size ranges are established based on temple to temple frame size measurements of a plurality of frames.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF PREFERRED EMBODIMENTS

Figure 1:
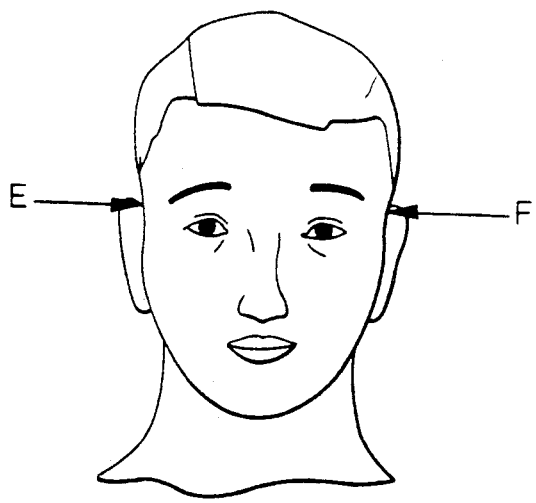
FIG. 1 is a front elevational view of a wearer's head and face, generally indicating the location at which the temple to temple head size is measured.
Figure 2:
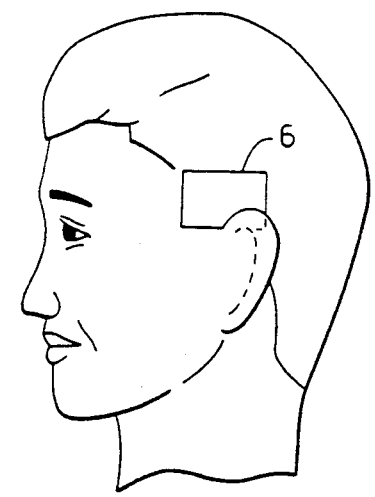
FIG. 2 is a diagrammatic side view of a wearer's head and face, showing the general area at which the temple to temple head size measurement is taken.

Referring now to the drawings, FIG. 1 shows a diagrammatic front view of a wearer's head and face. Arrows E and F point generally to respective positions on either side of the wearer's head, near the temples. The distance between these two locations is referred to herein and in the claims as the temple to temple head size of the wearer. FIG. 2 illustrates a side view of the wearer's head, and identifies region 6 near the ear. Region 6, located on both sides of the head, is the preferred area of measurement in which the temple to temple head size of the wearer is measured. Arrows E and F (FIG. 1) each point to respective positions within the preferred areas of measurement, i.e. region 6, on respective sides of the head. It is noted that in other embodiments the exact shape and location of the preferred area of measurement may be different from that shown.

Figure 3:
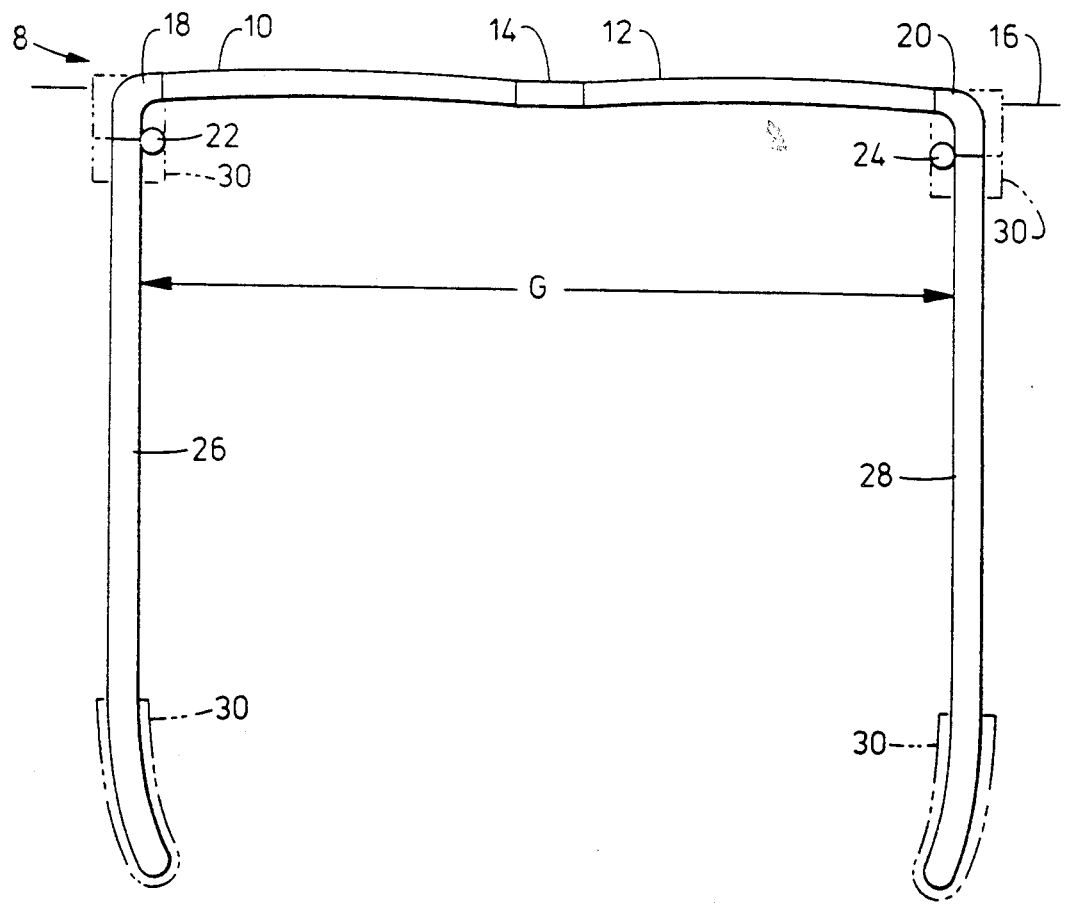
FIG. 3 is a diagrammatic plan view of a typical eyeglass frame.

FIG. 3 is a diagrammatic plan view of a typical eyeglass frame, generally indicated at 8, having lens openings 10 and 12 separated by bridge 14. Lens openings 10 and 12 generally identify a plane 16 which is intended to be equidistant from the left and right eye when the wearer is wearing the frame.

Extending from the outside of each lens opening 10 and 12 are respective overhanging portions 18 and 20. As shown in FIG. 3, overhanging portions 18 and 20 may extend rearwardly from plane 16. It is noted that the actual configuration of the overhanging portions depends upon the style and construction of the frames.

Temple pieces 26 and 28 are pivotably carried by frame 8 through respective hinges 22 and 24. As illustrated in FIG. 3, temple pieces 26 and 28 extend rearwardly from plane 16, and are illustrated as being generally parallel and perpendicular to plane 16. It is noted that when frames 8 are worn by the wearer, the relative orientation between temple piece 26, temple piece 28 and lens openings 10 and 12 depend upon the wearer's head and the placement of frame 8 thereon.

According to the teachings of the present invention, frame 8 has a temple to temple frame size which is defined to be the distance between the two temple pieces 26 and 28 when they are parallel to each other and perpendicular to plane 16. This distance is shown as dimension G in FIG. 3. The temple to temple frame size of a particular frame may be determined by measuring the distance between two corresponding points on the temple pieces, as close to the hinges as practically possible. The temple to temple frame size is determined without considering cosmetic constructions of the temple pieces, such as diagrammatically illustrated by phantom lines 30 in FIG. 3. The phantom lines 30 represent areas where the temple pieces may have an increased thickness, due to style or construction, in areas which do not directly affect the fit of the glasses. The temple to temple frame size measurement is taken as close as practically possible to the hinges to minimize errors which might occur from the temple pieces being non-parallel, non-perpendicular to plane 16, such as might occur when spring-loaded hinges are incorporated integrally in the temple pieces.

In practicing the teachings of the present invention, which is to use the temple to temple frame size of the frame and the temple to temple head size of the wearer to fit a frame to the wearer, it is necessary to determine the temple to temple frame size of each frame of the stock of frames from which the wearer will select his or her frame. This may be done by actually measuring the temple to temple frame size of each frame of the stock of frames. Alternatively, a less time consuming way is to measure the temple to temple frame size for each particular eye and bridge size of each frame style. It is noted that, because of manufacturing tolerances, the temple to temple frame size for frames having the same eye and bridge size and style may vary. In such case, it may be necessary to measure several frames of the same eye and bridge size and style to determine a statistical temple to temple frame size, such as by averaging. Statistical determination may always be used: However, if the variance from frame to frame of a particular eye and bridge size and style is too great, it may be preferable to measure each particular frame, or to require the manufacture of those frames to reduce the tolerance range of the temple to temple frame size.

In order to fit frames efficiently based on the wearer's head size, it is preferable to establish temple to temple size ranges and to group the frames according to these size ranges. The span of each temple to temple size range between these limits may be based on a statistical sampling of the temple to temple frame sizes of the available frames, or may be selected arbitrarily. The temple to temple size ranges may have uniform spans. The temple to temple size ranges may be non-overlapping and continuous with each other, in that the upper limit of one size range is the same as the lower limit of the next size range, except for the extreme upper and lower limits of the entire range covered by all of the temple to temple size ranges. The method of the present invention may also be practiced utilizing size ranges which have non-uniform spans, which are not continuous, or which are overlapping. An important aspect of practicing the present invention is that the frames are identified according to predetermined temple to temple size ranges.

According to one embodiment of the invention, the temple to temple size ranges are continuous and have spans of 4 millimeters. The ranges can be located in numerous ways. For example, the total range of temple to temple frame sizes of most adult-sized frames is generally from 120 millimeters to 160 millimeters. In one embodiment, the temple to temple size ranges are set up with 4 millimeter spans as 119.5 mm–123.5 mm, 123.5 mm–127.5 mm, 127.5 mm–131.5 mm, etc., throughout the total range. The total range of temple to temple frame sizes of most children's frames is generally from 108 millimeters to 130 millimeters. The temple to temple size ranges are set up with 4 millimeter spans, as 107.5 mm–111.5 mm, 111.5 mm–115.5 mm, 115.5 mm–119.5 mm, etc., over the total range.

According to another embodiment of the invention, consideration is given to the degree of accuracy of the measurement of the temple to temple sizes of the frames. In this embodiment, each frame is measured to the nearest millimeter (i.e., measurements above one half millimeter are rounded up). The temple to temple size ranges have spans of 3 millimeters, and are spaced apart by 1 millimeter. This results in non-continuous ranges having range to range spans of 1 millimeter, while the temple to temple size range is only 3 millimeters. In this embodiment, since the respective upper limit and lower limit of sequential temple to temple size ranges are different, there is no possibility that a temple to temple frame size measurement will be equal to a limit shared by the size ranges. As a practical matter, though, the rounding of the temple to temple frame size measurement to the nearest millimeter results in each non-continuous, 3 millimeter span size range encompassing temple to temple frame size measurements covering almost 4 millimeters. These ranges can be located numerous ways. One such way is that the respective lower limits of these ranges are divisible by 4 millimeters, e.g. 120 mm–123 mm, 124 mm–127 mm, 128 mm–131 mm, etc.

The rounding of the temple to temple frame sizes to the nearest millimeter when used with the continuous ranges described above, precludes a temple to temple frame size from falling exactly at the respective upper and lower limits of two sequential temple to temple size ranges. Other rounding criteria may be used.

Once a plurality of temple to temple size ranges have been determined, each of the frames is identified as having a respective temple to temple frame size which falls within one of the plurality of temple to temple size ranges. To so identify these frames, each temple to temple size range is assigned a respective designation which is indicative of that range. Each frame is associated with the respective designation assigned to the temple to temple size range within which the respective frame falls. Although many different designations may be used, according to the preferred embodiment, the designation is a group of colors, each of which designates a particular temple to temple size range. Each frame is associated with the color designation by affixing to the frame a tag which includes the appropriate size range color. As used herein, a tag may be adhered to or hung from the object to which it is affixed. In the preferred embodiment, color coded stickers are attached to the frames, such as being located on the frames themselves, or on a demonstration lens carried by the frames. This embodiment of the invention allows the frames to be located randomly without respect to their size ranges, since each frame carries its own size designation. Alternatively, the frames could be grouped according to size ranges, such as in display areas, for example on walls or in with the display trays, carrying the size range designation. Designations other than color may also be used, such as the specific numerical range of the temple to temple size range, geometric shapes, or any other designation sufficient to differentiate the temple to temple size ranges.

Once the frames have been identified as having a temple to temple frame size that falls within one of the predetermined temple to temple size ranges, the next step is to identify which of the predetermined temple to temple size ranges corresponds to the wearer. This is done by measuring the temple to temple head size of the wearer. The final step of this method of fitting eyeglass frames to a wearer is to fit an eyeglass frame selected from at least one temple to temple size range which was identified as corresponding to the wearer. It is noted that in some situations, optical and cosmetic considerations may override the present method of frame selection.

Figure 4:
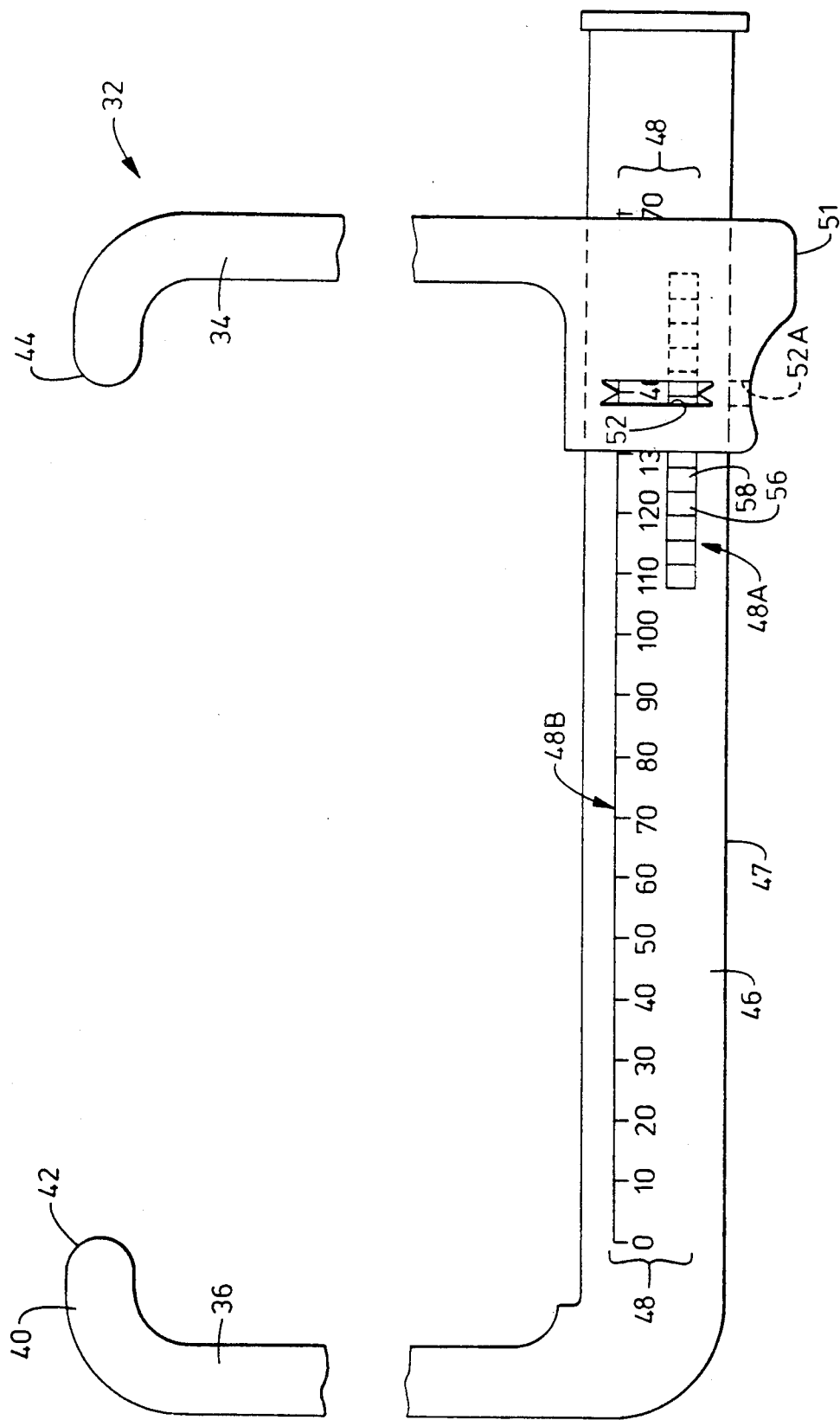
FIG. 4 is a side view of a caliper configured for taking the temple to temple head size measurement of the wearer.

In order to measure the temple to temple head size of the wearer, and use this information to identify the temple to temple size range corresponding to the wearer, it is preferable to use a measuring device to measure the temple to temple head size which automatically indicates any corresponding temple to temple size range or ranges. Such a measuring device may be any apparatus capable of measuring the distance between two points on a solid object, and capable of relating that distance to the predetermined temple to temple size ranges or ranges. According to the teachings of this invention, an apparatus is provided for measuring the temple to temple head size of the wearer. Referring now to FIG. 4, there is illustrated caliper 32 which includes two spaced-apart arms 34 and 36 which are moveable relative to each other. Each arm 34 and 36 includes respective distal end portions 38 and 40 which curve inwardly toward the other arm, terminating in respective measuring tips 42 and 44. This configuration provides a limited area of contact for accuracy. Arms 34 and 36 are sufficiently long to allow measuring tips 42 and 44 to be located adjacent the wearer's head to measure the temple to temple head size. It is noted that other configurations could be used, such as arms 34 and 36 being straight, rather than curved. Alternatively this could be done by any electronic measuring system adapted to indicate the corresponding temple to temple size range.

Figure 5:
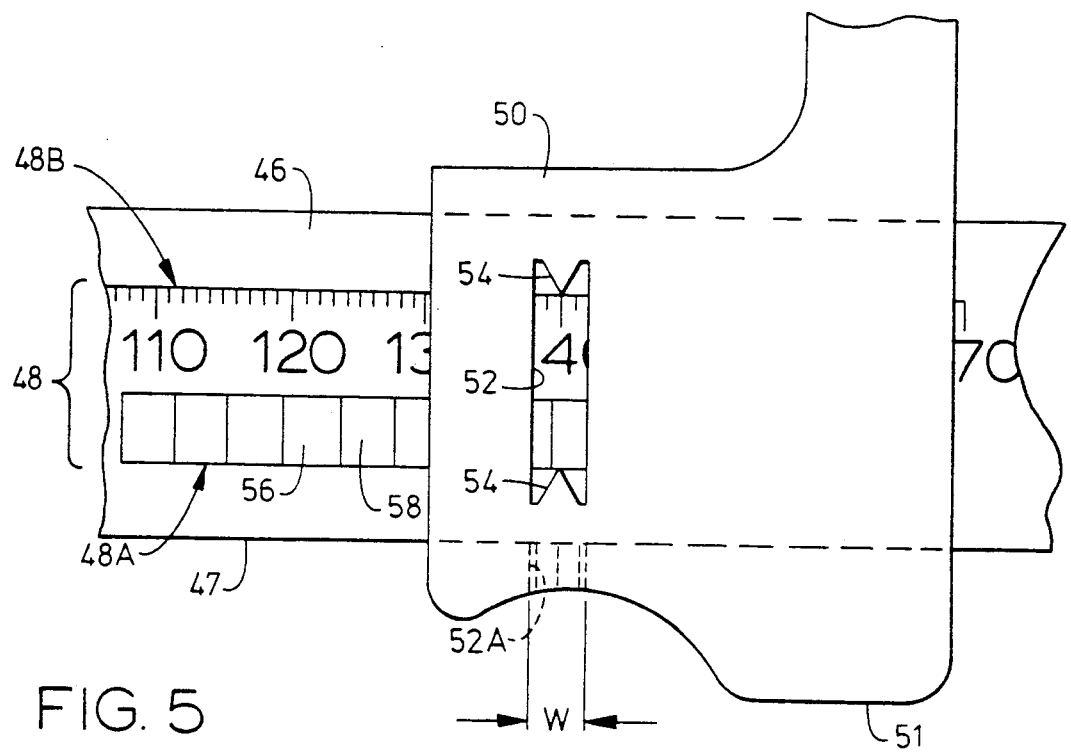
FIG. 5 is an enlarged fragmentary diagrammatic view of the indicator and scale of the caliper of FIG. 4

Arm 34 includes longitudinal member 46 connected to the proximal end of arm 34, which carries scale 48. Arm 36 includes end 50 which is disposed about and slidably carried by member 46. Referring also to FIG. 5, end 50 includes aperture or window opening 52 which allows scale 48 to be viewed therethrough. Window 52 also includes indicator arrows 54 which are aligned with the center of window opening 52. Indicator arrows 54 cooperate with scale 48 to indicate the distance between measuring tips 42 and 44. Although arrows 54 are shown aligned with measuring tip 44, arrows 54, window 52 and scale 48 could be offset from measuring tip 44, so long as cooperation therebetween is maintained.

Scale 48 includes the designations which have been assigned to the predetermined temple to temple frame size ranges. These designations may be the color coding of sequential segments of scale 48, may be written indicia such as numbers indicating the actual measurement between measuring tips 42 and 44, or other indicia sufficient to designate the predetermined temple to temple size ranges. In the preferred embodiment, scale 48 at least includes the color designations assigned to the respective temple to temple size ranges. It is noted that since there is an overlap of the adult total range and children total range, it is necessary for scale 48 to accommodate this overlap. This may be accomplished by having one color code scheme applied to the total range for adults and children.

In the embodiment of the invention described above in which the temple to temple size ranges are continuous, scale 48 includes color scale 48a having each of the color designations located such that indicator arrows 54 indicate the color designation of the temple to temple size range within which the wearer's temple to temple head size falls. In this embodiment, scale 48 also includes numerical scale 48b having the numerical measurement in millimeters as shown in FIG. 5. Respective areas on color scale 48a are colored the respective color corresponding to the respective size range. For example, area 56 includes a color designation extending between 119.5 mm to 123.5 mm, such as white. Area 58, adjacent area 56, includes a different color designation such as yellow. All frames having a temple to temple frame size falling within the temple to temple frame size range of 119.5 mm to 123.5 mm would carry a color designation of white. The same principle is applied to preferably the entire stock of frames being offered for selection.

Figure 6:
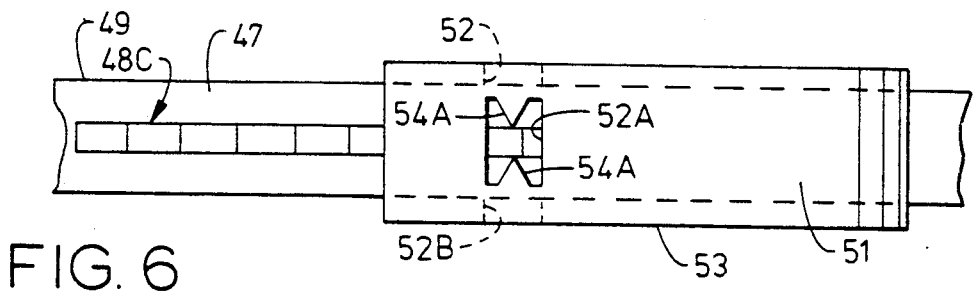
FIG. 6 is an enlarged fragmentary diagrammatic view of the bottom of the proximal end of the moveable arm of the caliper of FIG. 4.

Referring to FIGS. 4 and 6, bottom 51 of end 50 also includes window 52a with indicator arrows 54a. Color scale 48c is disposed along bottom 47 of longitudinal member 46 such that a portion of color scale 48c is viewable through window 52a. Optionally, an additional window 52b having indicator arrows (not shown) may be formed through side 53 of end 50. A scale (not shown) which may include a color scale and/or a numerical scale may be disposed on side 49 of longitudinal member 46 so as to be viewable through window 52b. It is noted that in the preferred embodiment, the width of windows 52, 52a and 52b are the same.

To use caliper 32 to identify at least one temple to temple size range which corresponds to the wearer, measuring tips 42 and 44 are located on either side of the wearer's head, in the preferred region of measurement as described above. A gentle but firm force is exerted against the wearer's head without squeezing the head. Scale 48 is then viewed through window 52 with indicator arrows 54 indicating the designation of the temple to temple size range in which the wearer's temple to temple head size falls.

According to the present invention, at least one temple to temple size range is identified as corresponding to the wearer. To facilitate the fitting of frames, window 52 has a width, W, which establishes a fitting range on either side of indicator arrows 54. Any temple to temple size range having at least a portion which falls within the fitting range is identified as corresponding to the wearer. Thus, any temple to temple size range having at least one of its respective upper and lower range limits within a fitting range of the wearer's temple to temple head size is identified as corresponding to the wearer. In this embodiment (i.e. continuous temple to temple size ranges), the span of the fitting range is defined by the width of the window. In one embodiment, the fitting range is equal to the span of the temple to temple size ranges, i.e. 4 millimeters, and can cover portions of up to two size ranges. In another embodiment, the fitting range is 9 mm, and can cover portions of up to four size ranges (4 mm span). It is noted that the fitting range may have a span which is not equal to the span of the temple to temple size ranges, and which may not be centered about indicator arrows 54. It is also noted that indicator arrows 54 may be omitted, relying only on window 52.

When the fitting range is identical to the spans of the size ranges, unless the temple to temple head size of the wearer is exactly in the middle of each temple to temple size range, two size ranges will be viewable through window 52. Although indicator arrows 54 will most likely fall within one of these two ranges, either temple to temple frame size range which is viewable through window 52 is considered to correspond to the wearer. As mentioned, this will typically result in two temple to temple size ranges corresponding to the wearer, although in the case where the temple to temple head size of the wearer falls exactly at the center of a temple to temple size range, i.e., only one size range designation appears in window 52, there will be only one temple to temple size range which is identified as corresponding to the wearer. If the fitting range is greater than the spans of the size ranges, then more than two size ranges may be viewable through window 52 and thusly identified as corresponding to the wearer. In the case of a 9 mm wide window and 4 mm size ranges, up to four size ranges may be viewable through window 52.

Figure 7:
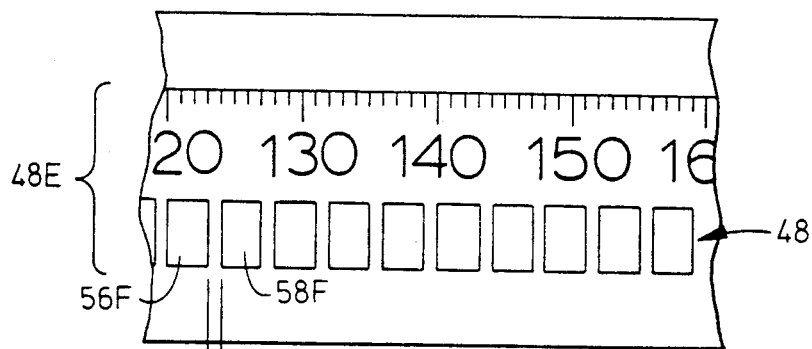
FIG. 7 is an enlarged fragmentary diagrammatic view of the scale of FIG. 4, showing the scale as having non-continuous temple to temple size ranges.

In the embodiment of the invention described above in which the temple to temple size ranges are not continuous, there is a range to range span which lies between each size range and is not part of either adjacent size range. In this embodiment, as illustrated in FIG. 7, scale 48e includes color scale 48f with, for example, color areas 56f and 58f, separated by area 57f which may have a "neutral" color which does not correspond to any of the size range designated colors. In this embodiment, it is possible that the temple to temple head size will not fall within any temple to temple size range, with indicator arrows 54 indicating on scale 48e the area between the size ranges, for example area 57a. Window 52, in one aspect of this embodiment, establishes a fitting range having a span greater than the range to range span. Preferably, in this embodiment, the fitting range span is equal to the span between the lower limits of adjacent non-continuous size ranges, which is 4 millimeters for the example described earlier. Because of the span of the fitting range, two size ranges may be visible through window 52, both of which are identified as corresponding to the wearer. If only one size range is displayed in window 52, then only one size range will be identified as corresponding to the wearer.

The practice of the method of the present invention does not require that caliper 32 be capable of indicating the actual temple to temple head size of the wearer, but only be capable of identifying the temple to temple size ranges which correspond to the wearer's temple to temple head size. In the preferred embodiment, colors are used to designate and signify the temple to temple size ranges, and correlate those ranges to the frames being offered for selection. Therefore, in the preferred embodiment, scale 48 need only include colored areas of the proper width arranged according to the temple to temple size ranges. As mentioned above, however, other indicia may indicate the various size ranges and be displayed on scale 48. It is noted that in the preferred embodiment, a numerical scale is also displayed, although it is not required in the preferred embodiment for the practice of this invention.

Once at least one temple to temple size range has been identified as corresponding to the wearer, the final step of the method is to fit an eyeglass frame to the wearer selected from at least one temple to temple size range. By following this method, the selection of an eyeglass frame can be done objectively based on temple to temple size ranges which correspond to the wearer, and on the identification of the frames being offered for selection which fall within the corresponding temple to temple size range.

In summary, numerous benefits result from employing the concepts of the invention as described. The method provides a consistent and prioritized approach to fitting eyeglasses based on objective criteria which increases the likelihood of a good fit in proportion to the wearer's face. This method gives the wearer a greater understanding as to the depth of selection offered by the fitter, making it easier to select properly fitting frames in less time. The selection of properly fitting frames results in fewer adjustments being necessary in order to fit the frame to the wearer's head. The method of the present invention is easy to communicate to the wearer, and helps to eliminate some of the guess work associated with the selection of frames.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A method of fitting an eyeglass frame to a wearer, comprising the steps of:
   (a) providing a plurality of frames, each of said frames being identified as having a respective temple to temple frame size falling within a respective one of a plurality of predetermined temple to temple size ranges;
   (b) identifying from said plurality of predetermined temple to temple size ranges at least one temple size range as corresponding to the wearer, said step of identifying at least one corresponding temple to temple size range comprising the step of measuring the temple to temple head size of the wearer; and
   (c) fitting an eyeglass frame to the wearer selected from a plurality of frames having respective temple to temple frame sizes which fall within one of said at least one temple to temple size range corresponding to the wearer.

2. The method according to claim 1, wherein the temple to temple head size is measured between a first position and a second position located on respective sides of the head of the wearer near the ears.

3. The method according to claim 1, wherein each of said temple to temple size ranges have respective upper and lower range limits, and wherein any temple to temple size range which has at least one of its respective upper and lower range limits within a predetermined fitting range of the temple to temple head size of the wearer is identified as corresponding to the wearer.

4. The method according to claim 3, wherein the respective spans of all temple to temple size ranges are equal, and wherein the span of said fitting range is equal to the span of said temple to temple size ranges.

5. The method according to claim 4, wherein one or more of the respective spans of each respective temple to temple size range and said fitting range is 4 millimeters.

6. The method according to claim 1, wherein the measuring step includes the step of providing means to measure the temple to temple head size of the wearer, said means including:
   (a) a pair of measuring tips, said measuring tips being moveable with respect to each other;
   (b) a scale;
   (c) indicator means for indicating on said scale a location which corresponds to the distance between said measuring tips;
   (d) a plurality of designations carried by said scale, each respective designation identifying a respective temple to temple size range, said designations being located on said scale at respective locations such that said indicator means indicate the respective designation of the temple to temple size range within which the distance between said measuring tips falls.

7. The method according to claim 1, wherein said plurality of predetermined temple to temple size ranges are continuous with each other.

8. The method according to claim 7, wherein the respective spans of all temple to temple size ranges are 4 millimeters.

9. The method according to claim 7, wherein each of said temple to temple size ranges have respective upper and lower range limits, the dimension of each respective upper and lower range limits being divisible by 4 millimeters.

10. The method according to claim 1 wherein said plurality of predetermined temple to temple size ranges are non-continuous with each, the respective range to range spans being located between respective sequential temple to temple size ranges.

11. The method according to claim 10 wherein the respective spans of all temple to temple size ranges are 3 millimeters.

12. The method according to claim 10 wherein the respective spans of all range to range spans are 1 millimeter.

13. The method according to claim 10 wherein each of said temple to temple size ranges have respective lower range limits, the dimension of each respective lower range limit being divisible by 4 millimeters.

14. The method according to claim 1, where the step of providing a plurality of frames includes the steps of:
 (a) assigning a respective designation to each temple to temple size range; and
 (b) associating each frame with the respective designation of the temple to temple size range within which the respective temple to temple frame size of that respective frame falls.

15. The method according to claim 14, wherein each respective designation is a number which designates a respective temple to temple size range.

16. The method according to claim 14, wherein each respective designation is a color which designates a respective temple to temple size range.

17. The method according to claim 16, wherein each frame carries a respective tag which includes a color which is the color that designates the respective temple to temple size range within which the temple to temple frame size of the respective frame falls.

18. The method according to claim 16, wherein the step of identifying at least one corresponding temple to temple size range comprises the steps of:
 (a) providing means for measuring the temple to temple head size of the wearer, said means including:
  (i) a pair of spaced apart measuring tips, said measuring tips being moveable with respect to each other;
  (ii) a scale;
  (iii) indicator means for indicating on said scale a location which corresponds to the distance between said measuring tips; and
  (iv) a plurality of colors corresponding to the color of said designations, said colors being carried by said scale, said colors being located on said scale at respective locations such that said indicator means indicate the respective color designation of the temple to temple size range within which the distance between said measuring tips falls; and
 (b) measuring the temple to temple head size of the wearer.

19. The method according to claim 1, wherein the step of providing a plurality of frames includes the step of:
 (a) establishing said plurality of temple to temple size ranges based on temple to temple frame measurements of a plurality of frames.

20. A device for measuring the temple to temple head size of wearer, comprising:
 (a) a first arm having a distal end comprising a first measuring tip, said first arm also having a first proximal end;
 (b) a longitudinal member connected to said first proximal end;
 (c) a second arm having a distal end comprising a second measuring tip, said second arm having a second proximal end configured to be slidably carried by said longitudinal member such that said first and second measuring tips are moveable with respect to each other;
 (d) a scale carried by said longitudinal member, said scale comprising a plurality of designations, said plurality of designations comprising a color strip having a plurality of colors arranged sequentially along said strip, each respective designation identifying a respective predetermined temple to temple size range; and
 (e) indicator means for indicating on said scale a location which corresponding to the distance between said first and second measuring tips, said plurality of designations being located on said scale such that said indicator means indicate the respective designation of the temple to temple size range within which the distance between said first and second measuring tips falls.

21. A device according to claim 20 wherein said indicator means comprises an aperture formed through said second proximal end, and wherein said scale is at least partially viewable through said aperture.

* * * * *